July 2, 1946.    H. B. GUSTAFSON    2,403,177
SUGAR TREATMENT
Filed May 11, 1944
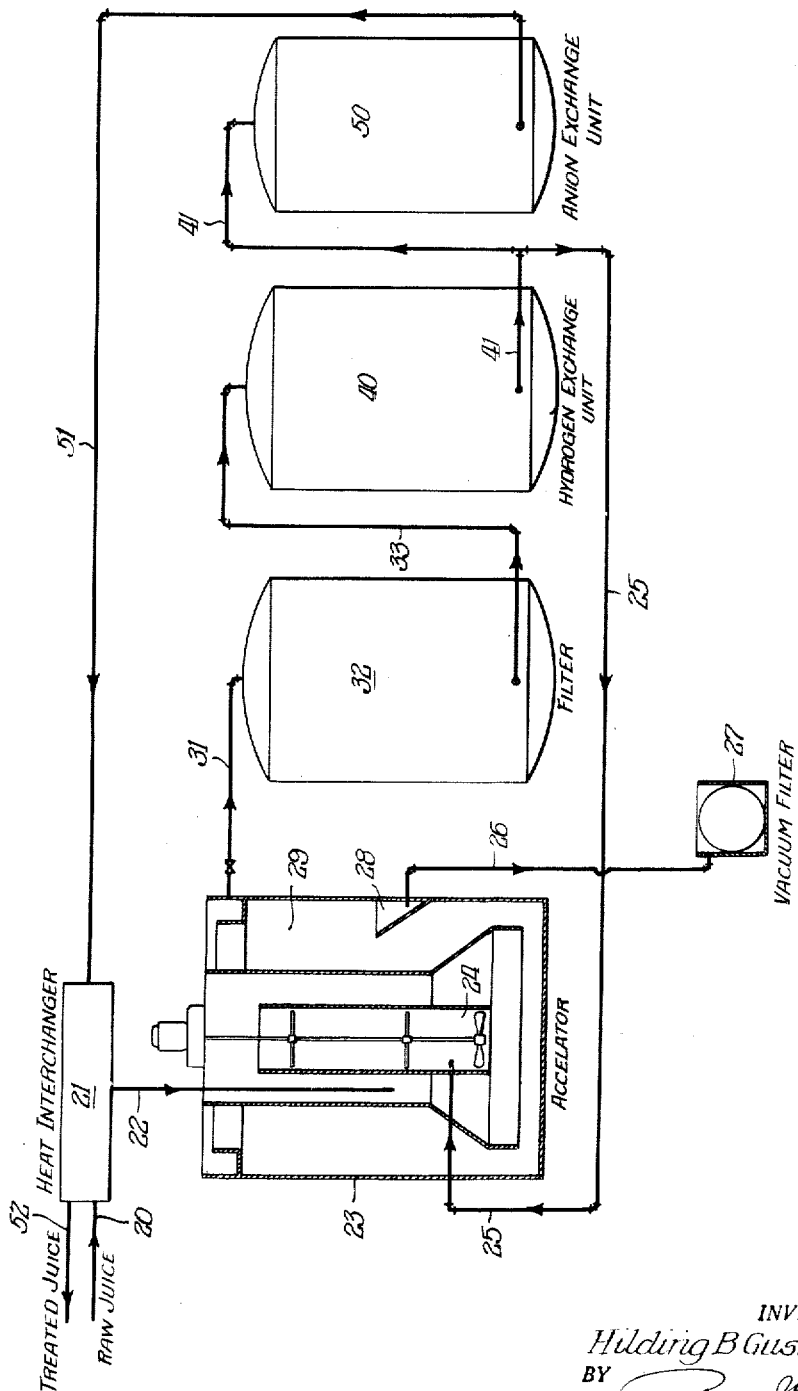
INVENTOR.
Hilding B Gustafson,
BY Patented July 2, 1946

2,403,177

UNITED STATES PATENT OFFICE 2,403,177

SUGAR TREATMENT

Hilding B. Gustafson, Hinsdale, Ill., assignor to Infilco Incorporated, Chicago, Ill., a corporation of Delaware Application May 11, 1944, Serial No. 535,109

6 Claims. (Cl. 127—46)

This invention relates to the purification of sugar juices. More specifically the invention relates to the purification of raw sugar juices.

Raw sugar juice coming from a diffusion battery or a crusher mill, contains many impurities that have to be removed from the juice before it can be successfully processed for consumption. While some of these impurities can be readily removed by mechanical means, such as a strainer, by far the greater part consists of dissolved materials or suspended colloids which are rather troublesome to remove. In this connection it must be remembered that the ordinary methods of liquid purification cannot be applied indiscriminately to the purification of sugar juices due to the physical and chemical nature of these juices. Thus sedimentation of precipitated impurities from a sugar juice is extremely slow due to the viscosity of the juice. On the other hand the use of chemicals for coagulation and precipitation of impurities is limited and needs more careful control in view of the danger of inversion of sucrose into uncrystallizable sugars, with corresponding loss in output of crystallizable sugar, or the formation of dark colored bodies in the juice which impair the color of the end product.

It has been usual to clarify sugar juices by defecation and while there are a great number of defecation methods known in the art of sugar manufacture, their principal elements are always the same: coagulation and precipitation of the non-sugars by heat and alkalis, followed by separation of the juice from the precipitate. In the treatment of beet juices the limed juice is customarily treated with carbon dioxide before decanting. The purity reached by these defecation processes is generally not more than 92% and is not satisfactory. Also the color of defecated juices is often relatively dark so that they must be bleached, as by sulfitation, active carbon treatment or bone-char filtration and the like. Moreover, the treatment of sugar juices by heat is always a precarious procedure due to the fact that inversion takes place much more readily at elevated temperatures. Sugar juices have a tendency toward formation of dark colored compounds when heated in the presence of alkalis or acids. When this occurs the color of the juice may be irreparably impaired. Further difficulties are caused by the liming. The question how much lime should be used and how it should be added to the juice has been answered in a multiplicity of ways, but there is no safe guide for an operator except his practical experience. Local overliming and "burning" of the juice is only one of the many deleterious results of improper liming. The chemical cost and equipment required for defecation often represents a substantial item in the total cost of the final product.

More recently it has been proposed to further purify defecated sugar juices by a hydrogen-anion exchange treatment. It has been found that not only the organic and inorganic acid, bases and salts present in the juice can be removed thereby but also a large part of the other non-sugars, such as colloids, gummy materials, coloring matter and the like, are precipitated when the pH of the juice is lowered by contact with the hydrogen exchange material. The acid juice resulting from the hydrogen exchange treatment is subsequently brought to a normal pH by contact with anion exchange material. The purity reached by this process is much higher than by defecation alone or defecation followed by sulfitation, bone-char filtration and similar conventional steps. However, the complete process necessarily includes defecation, which removes much of colloidal and gummy impurities. Without such prior defecation the hydrogen exchanged material becomes so fouled by such impurities that economical operation is impossible. The combined defecation and hydrogen and anion exchange treatment is quite expensive in equipment and labor. Moreover the above mentioned dangers inherent in defecation, such as "burning" of the juice during liming, etc. are not avoided.

In the copending application, Serial No. 451,950, I have, together with another, proposed to eliminate the expensive and troublesome process of defecation and subject a raw sugar juice directly to a hydrogen-anion exchange treatment. When a raw sugar juice is treated in this way a great quantity of dissolved and suspended impurities is precipitated as a slimy precipitate, which would immediately clog a bed of hydrogen exchange material. In the above mentioned copending application we have, therefore, proposed to use a hydrogen exchange material in powder form, mix it with the juice and discard it with the precipitate. This procedure is quite expensive due to the continuous loss of hydrogen exchange material. The use of high capacity material in this manner is quite impractical in view of the high cost of such material. Thus material of lesser capacity has to be used, which means, of course, that a great quantity of material is needed for complete treatment which again necessitates large equipment and high costs.

I now propose to treat raw sugar juices by a hydrogen-anion exchange process in a new and improved manner. In my new process I use a bed of hydrogen exchange material that may be regenerated periodically, thus avoiding the continuous loss of material necessitated in my above mentioned process. On the other hand I avoid clogging of the bed that would occur if the slimy mud that forms by acid treatment of a raw sugar juice were allowed to precipitate in the hydrogen exchange bed. In my new process the juice is introduced into the hydrogen exchange bed only after this slimy precipitate has been removed. In this respect my process is somewhat similar to that utilizing a hydrogen-anion exchange treatment of defecated juices. It differs, however, basically from this type of treatment, in that I do not defecate the juice, at least in the usual meaning of the term, prior to the exchange treatment but remove the colloids in a simpler, cheaper and more efficient way. Instead of the troublesome and expensive steps of liming, heating, and carbonating I use a single step for the precipitation of colloids and gums from the raw juice, and I can remove the colloids by this step in a safer, quicker and more complete manner than is possible in the conventional defecation methods. I work entirely on the acid side and precipitate the colloids, gums and the like, by lowering the pH of the raw juice instead of its customary raising as in lime defecation. Moreover, my process does not only eliminate the cost of expensive equipment and labor by replacing a plurality of treatment steps by a single step, but makes also a considerable saving in cost of chemicals possible. This is due to the fact that the acid used for precipitation of the colloids is formed in the process. A further and important advantage of my process consists in the fact that heating is entirely avoided and the process is carried out at a temperature below that at which inversion occurs readily.

Thus in one aspect my invention has to do with the replacement of defecation by a simpler, cheaper and less troublesome method of purification.

Another aspect of my invention relates to an improvement in the treatment of an undefecated juice by cation-anion exchange.

Still another aspect of my invention relates to the utilization of acid formed in the process for precipitation of colloids from the juice.

Briefly, my invention comprises passing clarified sugar juice through a bed of hydrogen zeolite, passing a portion of the acid effluent of the hydrogen zeolite bed through an acid absorbing material usually resinous in nature, mixing the remainder of the hydrogen zeolite effluent with raw, unclarified sugar juice thereby precipitating colloids in the raw juice, and separating the juice from the precipitate, thus completing the cycle.

My invention also comprises apparatus suitable for carrying out this process.

An object of this invention is an improved process and apparatus for the purification of raw sugar juices.

Another object of the invention is the purification of raw sugar juices under acid conditions.

A further object of the invention is an improved process and apparatus for purifying raw sugar juices by hydrogen exchange treatment followed by anion exchange treatment.

Another object of the invention is to eliminate, in the purification of raw sugar juices, the defecation process and to substitute therefor a single, cheap and less troublesome treating step.

A specific object of the invention is to precipitate colloids dissolved and suspended in a raw sugar juice by treating unheated juice with acid, and to use as the source of such acid a juice that has been previously treated with a hydrogen exchanger.

Another object of my invention is a continuous cycle process of sugar purification wherein the treated juice from a subsequent step is used as treating agent in a prior step.

Other objects of the invention will become apparent upon consideration of the description and claims which follow.

The invention will be more fully understood by reference to the drawing which forms part of this application and wherein an apparatus for carrying out the process of the invention is diagrammatically shown.

Raw juice from a diffusion battery or a crusher mill, not shown, is first preferably passed by any suitable means, such as a pipe 20, through a cooler, preferably a heat-exchanger 21, as shown, and is cooled during passage therethrough to a temperature below that at which inversion occurs readily in an acid juice, such as down to about 20° C. The cooled juice passes through an inlet conduit 22 to a solids precipitating and separating unit 23. While any suitable precipitating apparatus may be used, I prefer to use one of the type wherein a liquid to be treated and a treating reagent are mixed and agitated in and with a slurry comprising a relatively large amount of previously precipitated solids held suspended in liquid undergoing treatment. Such apparatus are well known in the art and need not be described in detail; they may take a variety of forms. For example, the apparatus shown in the copending application of Green et al., Serial No. 457,100 may be used; or an "accelerator" of the type shown in the Hughes patent No. 2,245,588, would be suitable, or various other forms could be chosen. Such slurry type treating apparatus comprise generally a mixing and reaction zone wherein liquid to be treated, reagent and slurry are turbulently mixed and agitated and through which the resulting mixture is repeatedly circulated, and a clarification zone wherein the treated liquid separates from the precipitate to be withdrawn as clarified liquid.

The cooled juice from the heat exchanger 21 passes through inlet conduit 22, discharging preferably into the mixing and reaction zone or chamber 24 of the solids precipitation and separation unit 23. Also strongly acid juice coming from a subsequent treating step through recirculation conduit 25 and serving as a treating reagent in the precipitating step, as will be explained more fully hereafter, discharges into the mixing and reaction zone 24 but preferably at a point spaced from the point of entry of the raw juice. The raw juice and the acidified juice are mixed together in and with a slurry comprising a large amount of particles precipitated from previously treated juice and suspended in juice undergoing treatment. The resulting mixture is agitated and repeatedly circulated through the mixing and reaction chamber 24. When the pH of the raw juice is lowered by admixture thereto of the acid juice most of the colloids are precipitated therefrom as they pass through their isoelectric points. This precipitation takes place in the presence of previously precipitated particles which serve as nuclei on which newly forming solids precipitate and fine suspended particles deposit. Thus relatively large heavy compact solids are formed instead of the usual formation of a great number of fine light solids and the resulting mud is easy to dewater. Before being withdrawn from the precipitation unit through a conduit 26 and passed to a vacuum filter or other dewatering device 27 the mud may be first concentrated in a concentrator 28, as is well known in the art.

While I have shown and described the precipitation of colloids from raw juice as taking place in a slurry treatment type apparatus it will be obvious that this step of the process can be carried out, and good results be had, in any conventional precipitation apparatus which provides for efficient mixing of the raw juice and the acid juice and affords prompt separation of the juice from the precipitate. It will be understood that the essence of this process step resides in the mixing and reacting of the raw juice with the acidified juice. It is of great value that this mixing occur in the presence of suspended precipitate, as described above, as this accelerates the reactions and improves the quality of the mud. Such a slurry type process allows considerable saving in equipment and labor, but it is not an essential element of my process.

Clarified juice separates continuously from the slurry and is withdrawn from the clarification space 29 of the precipitating and separating apparatus 23, through a conduit 31 to a filter 32, through which the juice passes to remove therefrom any fine solids that may have been carried over. The filter 32 may be of any conventional design, and suitable filter aids may be used for better filtration, if desired. In some cases the filter may be dispensed with, but ordinarily it will be used to insure complete removal of all suspended solids before the juice enters the following treating step.

From the filter 32 the juice passes through a conduit 33 to a hydrogen exchange unit 40. The hydrogen exchanger 40 may be of conventional design and contain a bed of cation exchange material regenerated with acid, through which the juice is passed. Such cation exchangers capable of operating as hydrogen zeolites are well known and need not be described. While the juice passes through the hydrogen exchange bed metallic cations in the juice are exchanged for hydrogen ions from the exchange material, whereby the corresponding free acids are formed in the juice. Since substantially all the colloids have been previously removed from the juice no appreciable precipitation occurs in the bed of hydrogen exchange material that might clog the bed and shorten its operating cycles unduly. When the exchange material becomes exhausted the bed may be regenerated by acid in known manner. It will be obvious that a plurality of beds may be used and that they may be connected to operate in sequence or in parallel, as is well known in the art.

When the juice leaves the hydrogen exchange unit 40 it is strongly acid and can now be returned to the precipitating step of the process to serve as the acid reagent for precipitation of colloids from the raw juice. A recirculation conduit 25 may lead either directly from the hydrogen exchange unit 40 or, as shown, branch off from the conduit 41, leading therefrom and discharge either into the inlet conduit 22 or, preferably and as shown, directly into the mixing and reaction chamber 24 of the solids precipitating and separating apparatus 23. As pointed out above it is preferred that the recirculation conduit discharge at a point remote from the point of discharge of the inlet conduit 22, so that the entering raw juice is mixed with slurry before it reacts with the recirculated acidified juice. The quantity of juice to be thus returned to the precipitation step will depend on various factors, such as the quantity and quality of the precipitable impurities contained in the raw juice, the acidity of the hydrogen exchange treated juice, etc. As these and other factors vary, the quantity of recirculation will vary and it may be anything from about a volume equal to the throughput—which seems to be the minimum amount necessary—up to as much as a tenfold volume. It will, however, be understood that the ratio of recirculated juice to raw juice will be maintained at the lowest figure that will allow good precipitation and coagulation of the colloids, in order to avoid unnecessary pumping and oversize equipment.

A throughput quantity of acidified juice is continuously passed from the hydrogen exchange unit 40, through the conduit 41, to an acid removal unit 50. The acid removal unit 50 may be of conventional design and contain a bed of anion exchange material through which the juice is passed. When the juice contacts the anion exchange material the free acids that have been formed in the juice during the hydrogen exchange treatment are removed. When the juice leaves the acid removal unit its pH is sufficiently raised that it can be sent to the evaporation step without danger of inversion. It will be obvious that the anion exchange material may be regenerated with alkali when it is exhausted, and that a series of anion exchange beds may be provided and may be connected in parallel or in sequence, as is well known in the art.

The juice leaves the acid removal unit 50 through an effluent conduit 51. On its way to the evaporation station the cool purified juice may pass through the heat-exchanger 21 and assist in cooling the incoming raw juice also passing therethrough. In this way the temperature of the purified juice is already raised before it reaches the evaporators through the conduit 52.

It will be apparent from the above description that my process and apparatus afford a new, simple and efficient means of purifying raw sugar juices which eliminates the dangers inherent in heating and liming while at the same time avoiding waste of hydrogen exchange material and realizing a substantial saving of chemicals. Whether the acid juice reacts with the colloids of the raw sugar juice in the same manner as any other acid that might be used and precipitation and coagulation occurs only due to its acidity, or whether there are other or additional reactions involved due to the fact that the juice has been treated by hydrogen exchange is not quite clear to me. However that may be, I have found the use of such acid juice a very convenient, cheap and efficient expedient for my problem.

Many modifications and variations of the invention set forth may be made without departing from the spirit and scope hereof, as will be obvious to those skilled in the art. Accordingly, the appended claims are to be given an interpretation commensurate with the novelty herein described and as broad as may be permitted by the prior art.

I claim:

1. A method of purifying raw sugar juices comprising passing entering raw juice and acid effluent from a hydrogen exchange bed into a mixing and reaction zone and mixing and agitating the juices therein in and with a circulating slurry containing previously precipitated solids suspended in juice undergoing treatment, whereby colloidal impurities are precipitated on previously precipitated particles, separating the precipitate from the juice, concentrating and withdrawing a portion of separated precipitate, filtering the separated juice, passing the filtered juice through a hydrogen exchange bed, passing a portion of acid effluent from the hydrogen exchange bed corresponding to the quantity of entering raw juice through an anion exchange bed, returning the balance of said acid effluent to said mixing and reaction zone and mixing it therein with newly entering raw juice in and with said slurry, and withdrawing treated juice from said anion exchange bed.

2. A process for the purification of raw sugar juice comprising continuously introducing raw juice into a mixing and reaction zone, continuously introducing a portion of juice previously treated in a subsequent hydrogen exchange zone into said mixing and reaction zone, mixing said juices in said mixing and reaction zone, thereby precipitating colloids contained in said raw juice, separating the mixed juice from the precipitate in a separating zone, contacting the separated juice with hydrogen exchange material, thereby exchanging cations in said juice for hydrogen ions from said material and forming free acids in said juice, contacting a portion of the acid containing juice with acid removal material to remove said acids, and mixing another portion of said acid containing juice with a new portion of raw juice in said mixing and reaction zone.

3. A closed cycle process of raw sugar purification comprising continuously reacting entering raw juice with juice recirculated from a subsequent treating step and separating precipitate formed in the reaction, passing the separated juice through a hydrogen exchange zone, passing effluent from the hydrogen exchange zone through an anion exchange zone, continuously withdrawing purified juice from the anion exchange zone and continuously recirculating a predetermined quantity of effluent from the hydrogen exchange zone to newly entering juice and reacting it therewith.

4. In the purification of raw sugar juice the steps of precipitating colloids from raw juice by mixing newly entering raw juice with at least an equal volume of partially treated juice that has passed through subsequent treating steps of the process, separating the juice from the precipitates formed by such reaction, contacting the separated juice with hydrogen exchange material to remove metal ions, contacting a portion of the hydrogen exchange treated juice with anion exchange material to remove acids, and recirculating to said precipitating step a portion of hydrogen exchange treated juice at least equal to the throughput flow and prior to contact with anion exchange material to provide said volume of partially treated juice for admixture with newly entering juice.

5. A process of purifying raw sugar juice comprising the steps of mixing raw sugar juice with an amount of acid juice from a subsequent treating step sufficient to precipitate a substantial amount of colloids from the raw juice, separating the juice from the precipitate, treating the separated juice with hydrogen exchange material to remove metal ions and form free acids in the juice, returning an amount of the acid containing juice sufficient to precipitate a substantial amount of colloids from newly entering juice to said mixing step for admixture with further portions of raw juice, and passing the balance of the acid juice to an acid removal step.

6. A process for purifying raw sugar juice comprising the steps of cooling the raw juice to a temperature of about 20° C., mixing the cooled raw juice with an amount of acid juice from a subsequent treating step sufficient to precipitate a substantial amount of colloids from the cooled raw juice, separating the precipitate from the juice, treating the clarified juice with an amount of hydrogen exchange material sufficient to exchange metallic cations for hydrogen ions from the exchange material, thereby converting the salts in solution to the corresponding free acids, returning an amount of the acid containing juice sufficient to precipitate a substantial amount of colloids from newly entering cooled juice for admixture with such cooled juice, and contacting the balance of the acid juice with an amount of anion exchange material sufficient to remove acid therefrom.

HILDING B. GUSTAFSON.

---

Certificate of Correction

July 2, 1946.

Patent No. 2,403,177.

HILDING B. GUSTAFSON

It is hereby certified that errors appear in the printed specification of the above numbered patent requiring correction as follows: Column 2, line 25, for "changed" read *change*; column 4, line 38, for " "accelerator" " read "*Accelator*"; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.* the juices therein in and with a circulating slurry containing previously precipitated solids suspended in juice undergoing treatment, whereby colloidal impurities are precipitated on previously precipitated particles, separating the precipitate from the juice, concentrating and withdrawing a portion of separated precipitate, filtering the separated juice, passing the filtered juice through a hydrogen exchange bed, passing a portion of acid effluent from the hydrogen exchange bed corresponding to the quantity of entering raw juice through an anion exchange bed, returning the balance of said acid effluent to said mixing and reaction zone and mixing it therein with newly entering raw juice in and with said slurry, and withdrawing treated juice from said anion exchange bed.

2. A process for the purification of raw sugar juice comprising continuously introducing raw juice into a mixing and reaction zone, continuously introducing a portion of juice previously treated in a subsequent hydrogen exchange zone into said mixing and reaction zone, mixing said juices in said mixing and reaction zone, thereby precipitating colloids contained in said raw juice, separating the mixed juice from the precipitate in a separating zone, contacting the separated juice with hydrogen exchange material, thereby exchanging cations in said juice for hydrogen ions from said material and forming free acids in said juice, contacting a portion of the acid containing juice with acid removal material to remove said acids, and mixing another portion of said acid containing juice with a new portion of raw juice in said mixing and reaction zone.

3. A closed cycle process of raw sugar purification comprising continuously reacting entering raw juice with juice recirculated from a subsequent treating step and separating precipitate formed in the reaction, passing the separated juice through a hydrogen exchange zone, passing effluent from the hydrogen exchange zone through an anion exchange zone, continuously withdrawing purified juice from the anion exchange zone and continuously recirculating a predetermined quantity of effluent from the hydrogen exchange zone to newly entering juice and reacting it therewith.

4. In the purification of raw sugar juice the steps of precipitating colloids from raw juice by mixing newly entering raw juice with at least an equal volume of partially treated juice that has passed through subsequent treating steps of the process, separating the juice from the precipitates formed by such reaction, contacting the separated juice with hydrogen exchange material to remove metal ions, contacting a portion of the hydrogen exchange treated juice with anion exchange material to remove acids, and recirculating to said precipitating step a portion of hydrogen exchange treated juice at least equal to the throughput flow and prior to contact with anion exchange material to provide said volume of partially treated juice for admixture with newly entering juice.

5. A process of purifying raw sugar juice comprising the steps of mixing raw sugar juice with an amount of acid juice from a subsequent treating step sufficient to precipitate a substantial amount of colloids from the raw juice, separating the juice from the precipitate, treating the separated juice with hydrogen exchange material to remove metal ions and form free acids in the juice, returning an amount of the acid containing juice sufficient to precipitate a substantial amount of colloids from newly entering juice to said mixing step for admixture with further portions of raw juice, and passing the balance of the acid juice to an acid removal step.

6. A process for purifying raw sugar juice comprising the steps of cooling the raw juice to a temperature of about 20° C., mixing the cooled raw juice with an amount of acid juice from a subsequent treating step sufficient to precipitate a substantial amount of colloids from the cooled raw juice, separating the precipitate from the juice, treating the clarified juice with an amount of hydrogen exchange material sufficient to exchange metallic cations for hydrogen ions from the exchange material, thereby converting the salts in solution to the corresponding free acids, returning an amount of the acid containing juice sufficient to precipitate a substantial amount of colloids from newly entering cooled juice for admixture with such cooled juice, and contacting the balance of the acid juice with an amount of anion exchange material sufficient to remove acid therefrom.

HILDING B. GUSTAFSON.

---

Certificate of Correction

July 2, 1946.

Patent No. 2,403,177.

HILDING B. GUSTAFSON

It is hereby certified that errors appear in the printed specification of the above numbered patent requiring correction as follows: Column 2, line 25, for "changed" read *change*; column 4, line 38, for " "accelerator" " read "*Accelator*"; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*